United States Patent
Lim

(10) Patent No.: US 11,632,833 B1
(45) Date of Patent: Apr. 18, 2023

(54) METHOD AND SYSTEM FOR CONTROLLING LIGHTING BASED ON INFLUENCE OF LIGHTING

(71) Applicant: KONGJU NATIONAL UNIVERSITY INDUSTRY-UNIVERSITY COOPERATION FOUNDATION, Chungcheongnam-do (KR)

(72) Inventor: Jaehyun Lim, Chungcheongnam-do (KR)

(73) Assignee: KONGJU NATIONAL UNIVERSITY INDUSTRY—UNIVERSITY COOPERATION FOUNDATION, Gongju (KR)

( * ) Notice: Subject to any disclaimer, the term of this patent is extended or adjusted under 35 U.S.C. 154(b) by 0 days.

(21) Appl. No.: 17/650,807

(22) Filed: Feb. 11, 2022

(30) Foreign Application Priority Data

Oct. 6, 2021 (KR) .......................... 10-2021-0132035

(51) Int. Cl.
*H05B 45/12* (2020.01)
(52) U.S. Cl.
CPC .................... *H05B 45/12* (2020.01)
(58) Field of Classification Search
CPC ........ H05B 45/12; H05B 45/22; H05B 45/10; H05B 47/11; H05B 47/19
See application file for complete search history.

(56) References Cited

U.S. PATENT DOCUMENTS

| | | | |
|---|---|---|---|
| 10,251,242 B1* | 4/2019 | Rosen | H04L 12/282 |
| 2005/0219460 A1* | 10/2005 | Blum | G02C 7/06 351/159.73 |
| 2012/0206050 A1* | 8/2012 | Spero | B60Q 1/1423 315/152 |
| 2018/0043130 A1* | 2/2018 | Moore-Ede | A61M 21/02 |
| 2018/0168020 A1* | 6/2018 | Casey | G05B 15/02 |
| 2018/0311386 A1* | 11/2018 | Hawkins | H05B 47/19 |
| 2019/0182933 A1* | 6/2019 | Lu | H05B 47/115 |
| 2019/0182934 A1* | 6/2019 | Lu | H05B 47/19 |
| 2019/0220728 A1* | 7/2019 | Lu | H05B 47/115 |
| 2019/0220729 A1* | 7/2019 | Lu | H05B 47/115 |
| 2021/0112647 A1* | 4/2021 | Coleman | H05B 47/11 |
| 2022/0022304 A1* | 1/2022 | Tay | H05B 47/13 |

FOREIGN PATENT DOCUMENTS

CN 112996201 A * 6/2021

* cited by examiner

*Primary Examiner* — Abdullah A Riyami
*Assistant Examiner* — Syed M Kaiser
(74) *Attorney, Agent, or Firm* — Culhane Meadows PLLC

(57) ABSTRACT

A method of controlling lighting based on influence of the lighting may include: classifying a predetermined area including a plurality of lightings into a plurality of sub-areas; calculating a detailed influence of each of the plurality of lightings on each of the plurality of sub-areas; determining an influence of each of the plurality of lightings on the predetermined area by using a sum of the calculated, detailed influences on the plurality of respective sub-areas; determining ranking of influence of the plurality of lightings, based on each of the determined influences of the plurality of respective lightings; and controlling the plurality of lightings based on the determined ranking of influence of the plurality of lightings.

7 Claims, 8 Drawing Sheets

METHOD AND SYSTEM FOR CONTROLLING LIGHTING BASED ON INFLUENCE OF LIGHTING

CROSS-REFERENCE TO RELATED APPLICATIONS

This application claims priority under 35 U.S.C. § 119 to Korean Patent Application No. 10-2021-0132035, filed on Oct. 6, 2021, in the Korean Intellectual Property Office (KIPO), the disclosure of which is incorporated by reference herein in its entirety.

TECHNICAL FIELD

The present disclosure relates to a method and system for controlling lighting based on influence of lighting, and more particularly, to a method and system for controlling lighting based on influence of lighting by using influence of each of a plurality of lightings included in a predetermined area.

BACKGROUND

Recently, there are increasing cases in which a uniform lighting environment is created in an indoor space by arranging a plurality of lighting sources. In general, when multiple lightings are applied, the lightings are installed after confirming distribution of illuminance formed in the indoor space through simulation. In multiple-lighting environments, in order to provide a uniform illuminance indoors, adjustment on arrangement intervals of lightings or comprehensive (e.g., uniform) illuminance adjustment is performed. However, when a plurality of lightings are applied in practice, under or excessive illuminance may be formed due to overlap of lights from the lightings, which may result in waste of lighting energy.

SUMMARY

One or more example embodiments provide a method, a non-transitory computer-readable recording medium, an apparatus, and a system for controlling lighting based on influence of lighting.

The present disclosure may be implemented in a variety of ways, including a method, a system (apparatus), or a computer program stored in a readable storage medium.

According to an embodiment, a method of controlling lighting based on influence of the lighting, which is performed by at least one processor, includes: classifying a predetermined area including a plurality of lightings into a plurality of sub-areas; calculating a detailed influence of each of the plurality of lightings on each of the plurality of sub-areas; determining an influence of each of the plurality of lightings on the predetermined area by using a sum of the calculated, detailed influences on the plurality of respective sub-areas; determining ranking of influence of the plurality of lightings, based on each of the determined influences of the plurality of respective lightings; and controlling the plurality of lightings based on the determined ranking of influence of the plurality of lightings.

In some embodiments, the calculating of the detailed influence of each of the plurality of lightings on each of the plurality of sub-areas may include: determining a vertical illuminance value for each of the plurality of lightings; determining an illuminance value according to a distance for each of the plurality of lightings; and calculating the detailed influence of each of the plurality of lightings on each of the plurality of sub-areas by using a ratio of the illuminance value according to the distance on each of the plurality of sub-areas to the vertical illuminance value for each of the plurality of lightings.

In some embodiments, the controlling of the plurality of lightings based on the determined ranking of influence of the plurality of lightings may include: when lowering an illuminance of the predetermined area, controlling each of the plurality of lighting s in an ascending order of the determined influence ranking.

In some embodiments, the controlling of the plurality of lightings based on the determined ranking of influence of the plurality of lightings may include: when increasing an illuminance of the predetermined area, controlling each of the plurality of lightings in a descending order of the determined influence ranking.

In some embodiments, the method may further include: calculating a natural light score based on influence of a natural light on illuminance on the predetermined area, wherein the controlling of the plurality of lightings based on the determined ranking of influence of the plurality of lightings includes: controlling the plurality of lightings such that an illuminance value on the predetermined area is constantly maintained based on the calculated natural light score.

In some embodiments, the ranking of influence of the plurality of lightings may include ranking of influence on the predetermined area and ranking of influence on each of the plurality of sub-areas.

According to an embodiment, a non-transitory computer-readable recording medium storing instructions for execution by one or more processors that, when executed by the one or more processors, cause the one or more processors to perform the method is provided.

According to an embodiment, a lighting control system includes: a communication module; a memory; and at least one processor connected to the memory and configured to execute at least one computer-readable program included in the memory, wherein the at least one program includes instructions to: classify a predetermined area including a plurality of lightings into a plurality of sub-areas; calculate a detailed influence of each of the plurality of lightings on each of the plurality of sub-areas; determine an influence of each of the plurality of lightings on the predetermined area by using a sum of the calculated, detailed influences on the plurality of respective sub-areas; determine ranking of influence of the plurality of lightings, based on each of the determined influences of the plurality of respective lightings; and control the plurality of lightings based on the determined ranking of influence of the plurality of lightings.

BRIEF DESCRIPTION OF THE DRAWINGS

Embodiments of the present disclosure will be described with reference to the accompanying drawings described below, wherein like reference numerals denote like elements, but are not limited thereto.

DETAILED DESCRIPTION OF ILLUSTRATIVE EMBODIMENTS

Figure 1:
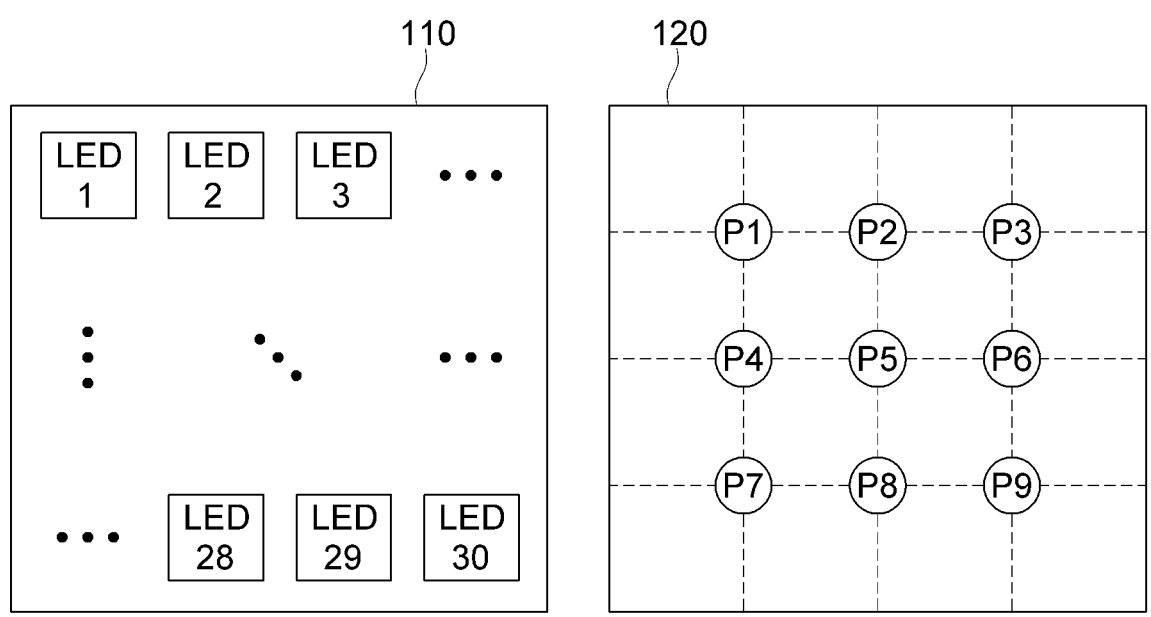
FIG. 1 is a diagram illustrating an example of a ceiling area and a floor area of a predetermined area according to an embodiment of the present disclosure.

Hereinafter, specific descriptions for carrying out the present disclosure will be described in detail with reference to the accompanying drawings. However, in the following description, if there is a risk of unnecessarily obscuring the gist of the present disclosure, detailed descriptions of well-known functions or configurations will be omitted.

In the accompanying drawings, the same or corresponding components are assigned with the same reference numerals. In addition, in the description of the embodiments below, overlapping description of the same or corresponding components may be omitted. However, even if descriptions regarding components are omitted, it is not intended that such components are not included in any embodiment.

Advantages and features of the disclosed embodiments and methods of achieving them will become apparent with reference to the embodiments described below in conjunction with the accompanying drawings. However, the present disclosure is not limited to the embodiments disclosed below, but may be implemented in various different forms, and these embodiments are only provided to complete the present disclosure and to facilitate understanding of those skilled in the art for the scope of the invention.

Terms used in this specification will be briefly described, and the disclosed embodiments will be described in detail. The terms used in the present specification have been selected as currently widely used general terms as possible while considering the functions in the present disclosure, but may vary depending on the intention or precedent of those skilled in the art, the emergence of new technology, and the like. In addition, in a specific case, there is a term arbitrarily selected by the applicant, and in this case, the meaning will be described in detail in the description of the corresponding invention. Accordingly, the terms used in the present disclosure should be defined based on the meaning of the term and the overall content of the present disclosure, rather than the simple name of the term.

References in the singular expressions herein include plural expressions unless the context clearly dictates the singular. In addition, the plural expression includes the singular expression unless the context clearly dictates the plural. Throughout the specification, when a part includes a certain element, this means that other elements may be further included, rather than excluding other elements, unless otherwise stated.

In the present disclosure, terms such as "comprises (includes)", "comprising (including)", etc. may indicate the presence of features, steps, operations, elements and/or components, although such terms do not exclude that one or more other functions, steps, acts, elements, components and/or combinations thereof are further added.

In the present disclosure, when a particular element is referred to as "coupling", "combining", "connecting", or "reacting" to any other element, the particular element is directly coupled to, combined with, and/or connected to or reacted with, but embodiments are not limited thereto. For example, there may be one or more intermediate components between a particular component and another component. In addition, in the present disclosure, "and/or" may include each of one or more listed items or a combination of at least a portion of one or more items.

In the present disclosure, terms such as "first" and "second" are used to distinguish a specific component from other components, and the above-described components are not limited by these terms. For example, a "first" component may be an element of the same or similar type as a "second" component.

FIG. 1 is a diagram illustrating an example of a ceiling area 110 and a floor area 120 of a predetermined area according to an embodiment of the present disclosure. According to an embodiment, a plurality of lightings (e.g., LED lightings) may be installed in the ceiling area 110 of the predetermined area. In the illustrated example, thirty LED lightings may be installed at the same interval in the ceiling area 110, but the present disclosure is not limited thereto, and any number of LED lightings may be installed. In addition, a plurality of illuminance sensors (e.g., P1 to P9) for measuring an illuminance of each LED lighting may be installed in the floor area 120 of the predetermined area. For example, the predetermined area may be classified into a plurality of logical sub-areas, and a plurality of illuminance sensors for measuring illuminance in each sub-area may be installed. In such an embodiment, the plurality of lightings may be lightings capable of conducting individual illuminance control and may be lightings of a plurality of channels (e.g., 4 channels of 2700K, 4000K, 6400K, and 7400K) capable of conducting step-by-step illuminance control.

According to an embodiment, a lighting control system is a system for efficiently using lighting energy of the predetermined area by controlling illuminance of lightings of the predetermined area, and it may communicate with a plurality of lightings and a plurality of illuminance sensors associated with the predetermined area to exchange and data and/or information required for control. For example, the lighting control system may classify a predetermined area including a plurality of lightings into a plurality of sub-areas. In such an embodiment, the plurality of sub-areas are areas associated with respective illuminance sensors and may be predetermined by a user or determined based on an installation location of the illuminance sensor.

Then, the lighting control system may calculate a detailed influence (e.g., degree of influence) that each of the plurality of lightings has on each of the plurality of sub-areas. In the illustrated example, the detailed influence of each of the thirty LED lightings on each of nine areas associated with P1 to P9 may be calculated. For example, the lighting control system may calculate the detailed influence of each lighting on the plurality of sub-areas by using a vertical illuminance of each lighting. In this case, the vertical illuminance of each lighting may be determined in advance or may be obtained by being measured by an arbitrary illuminance sensor. The lighting control system may measure the illuminance of each lighting for each sub-area and calculate the detailed influence by using the measured illuminance compared to the vertical illuminance of each lighting. For example, with respect to the LED 1 having a vertical illuminance of 813 LUX, when the illuminance measured at P1 is 472.55 LUX, the illuminance measured at P2 is 105.8 LUX, and the illuminance measured at P3 is 24.58 LUX, a detailed influence of the LED 1 on the area P1 may be 58.1%, the detailed influence of the LED1 on the area P2 may be 13%, and the detailed influence of the LED1 on the area P3 may be 3%.

The lighting control system may calculate an influence of each of the plurality of lightings on the predetermined area by using a sum of the calculated, detailed influences on the plurality of respective sub-areas. The influence of the lighting may be determined as the sum of the detailed influences of each of the lightings on the plurality of sub-areas. In addition, the lighting control system may determine ranking of influence of the plurality of lightings, based on the determined influences of the plurality of respective lightings. In the illustrated example, the influence (e.g., index of influence) and the ranking of influence of each lighting may be determined as shown in Table 1 below.

TABLE 1

| LED No. | Influence (%) of individual lighting for each point (sub-area) | | | | | | | | | Influence | |
|---|---|---|---|---|---|---|---|---|---|---|---|
| | P1 | P2 | P3 | P4 | P5 | P6 | P7 | P8 | P9 | Index | Rank |
| 1 | 58 | 13 | 3 | 15 | 6 | 2 | 5 | 2 | 1 | 105 | 28 |
| 2 | 94 | 38 | 7 | 19 | 10 | 3 | 5 | 3 | 2 | 181 | 17 |
| ... | | | | | | | | | | | |
| 9 | 58 | 77 | 17 | 41 | 55 | 14 | 10 | 11 | 3 | 286 | 4 |
| 10 | 19 | 77 | 58 | 14 | 54 | 41 | 3 | 11 | 10 | 287 | 3 |
| 11 | 7 | 38 | 94 | 5 | 26 | 62 | 2 | 7 | 12 | 253 | 7 |
| 12 | 3 | 13 | 58 | 3 | 9 | 41 | 2 | 3 | 10 | 142 | 23 |
| ... | | | | | | | | | | | |
| 15 | 24 | 27 | 11 | 58 | 89 | 18 | 24 | 27 | 11 | 289 | 1 |
| 16 | 11 | 27 | 24 | 18 | 88 | 58 | 11 | 27 | 24 | 288 | 2 |
| 21 | 10 | 11 | 3 | 41 | 54 | 14 | 58 | 77 | 17 | 285 | 6 |
| 22 | 3 | 11 | 10 | 14 | 54 | 41 | 17 | 77 | 58 | 285 | 5 |
| 23 | 2 | 7 | 12 | 5 | 25 | 62 | 7 | 38 | 95 | 253 | 9 |
| 24 | 2 | 3 | 10 | 3 | 10 | 41 | 3 | 13 | 58 | 143 | 21 |
| ... | | | | | | | | | | | |
| 29 | 2 | 3 | 5 | 3 | 10 | 19 | 7 | 38 | 94 | 181 | 20 |
| 30 | 1 | 2 | 5 | 2 | 5 | 16 | 3 | 13 | 58 | 105 | 29 |

As shown in Table 1, a lighting with a highest influence in the predetermined area may be LED 15, and a lighting with a second highest influence may be LED 16. In other words, the lightings such as LED 15 and LED 16 may cause a greater illuminance increase with lower energy consumption as compared to other lightings. Accordingly, the lighting control system may minimize energy consumption by controlling the lighting having a high influence when the illuminance rises, based on the corresponding influence. With such a configuration, in a lighting environment in which multiple lightings are installed, energy for lighting control may be effectively lowered by using the lighting control method based on influence.

Figure 2:
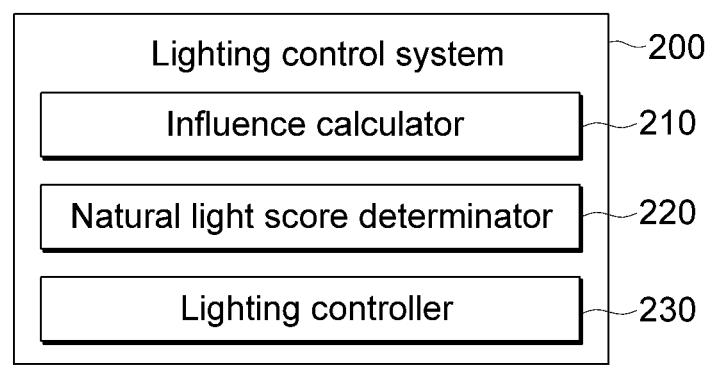
FIG. 2 is an exemplary block diagram illustrating an internal configuration of a lighting control system according to an embodiment of the present disclosure.

FIG. 2 is an exemplary block diagram illustrating an internal configuration of a lighting control system 200 according to an embodiment of the present disclosure. As illustrated, the lighting control system 200 (e.g., at least one processor of the lighting control system 200) may include an influence calculator 210, a natural light score determinator 220, a lighting controller 230, and the like, but embodiments are not limited thereto. The lighting control system 200 may communicate with a plurality of lightings and a plurality of illuminance sensors to exchange data and/or information required for lighting control.

The influence calculator 210 may calculate an influence of each of the plurality of lightings included in a predetermined area. In such an embodiment, the influence may indicate a magnitude of illuminance that the lighting exerts over the predetermined area. According to an embodiment, the influence calculator 210 may classify the predetermined area including the plurality of lightings into a plurality of sub-areas and calculate a detailed influence of each of the plurality of lightings on each of the plurality of sub-areas. In such an embodiment, the detailed influence may be determined as a ratio of an illuminance on each sub-area to a vertical illuminance of each lighting.

The influence calculator 210 may calculate an influence of each of the plurality of lightings on the predetermined area by using a sum of the calculated, detailed influences on the plurality of respective sub-areas. In addition, the influence calculator 210 may determine ranking of influence of the plurality of lightings based on the determined influences of the plurality of respective lightings. That is, in the plurality of lightings included in the predetermined area, the ranking of influence according to influence of illuminance on the overall predetermined area may be determined.

According to an embodiment, the natural light score determinator 220 may calculate a natural light score based on influence of a natural light on illuminance on the predetermined area. For example, when an illuminance on the predetermined area and/or the predetermined sub-area measured using an arbitrary sensor is changed, the natural light score determinator 220 may calculate a natural light score that indicates a degree by which the illuminance is changed due to the natural light. For example, the natural light score may be calculated by any algorithm or any machine learning model, but embodiments are not limited thereto.

The lighting controller 230 may control the plurality of lightings based on the influence ranking of the plurality of lightings determined by the influence calculator 210. According to an embodiment, the lighting controller may control the plurality of lightings based on the influence ranking to adjust the illuminance for the overall predetermined area. For example, when lowering the illuminance of the predetermined area, the lighting controller 230 may control each of the plurality of lightings in an ascending order of the determined influence ranking. In another example, when increasing the illuminance of the predetermined area, the lighting controller 230 may control each of the plurality of lightings in a descending order of the determined influence ranking.

Additionally, or alternatively, the lighting controller 230 may control the plurality of lightings so that an illuminance value on the predetermined area is constantly maintained based on the natural light score calculated by the natural light score determinator 220. For example, when it is determined that a degree of natural light directed to the predetermined area is large based on the natural light score and a predetermined reference, the lighting controller 230 may control each of the plurality of lightings in an ascending order of the determined influence ranking to lower the illuminance of the predetermined area. In another example, when it is determined that the degree of natural light directed to the predetermined area is small based on the natural light score and the predetermined reference, the lighting controller 230 may control each of the plurality of lightings in a descending order of the determined influence ranking to increase the illuminance of the predetermined area.

Additionally, or alternatively, the lighting controller 230 may perform lighting control based on the influence on the sub-area by using the detailed influence of each lighting. For example, detailed influence ranking may be determined based on the detailed influence of each of the plurality of lightings on each sub-area. In this case, when lowering an illuminance of a specific sub-area, the lighting controller 230 may control each of the plurality of lightings in an ascending order of the determined detailed influence ranking. In addition, when increasing the illuminance of the specific sub-area, the lighting controller 230 may control each of the plurality of lightings in a descending order of the determined detailed influence ranking.

In FIG. 2, each functional configuration included in the lighting control system 200 has been separately described above, but this is only to help the understanding of the invention, and one arithmetic device may perform two or more functions. With such a configuration, the lighting control system 200 may appropriately control the plurality of lightings according to the sub-area, the predetermined area, the natural light, and the like so that energy consumption of lighting is minimized in an environment in which the plurality of lightings are installed.

Figure 3:
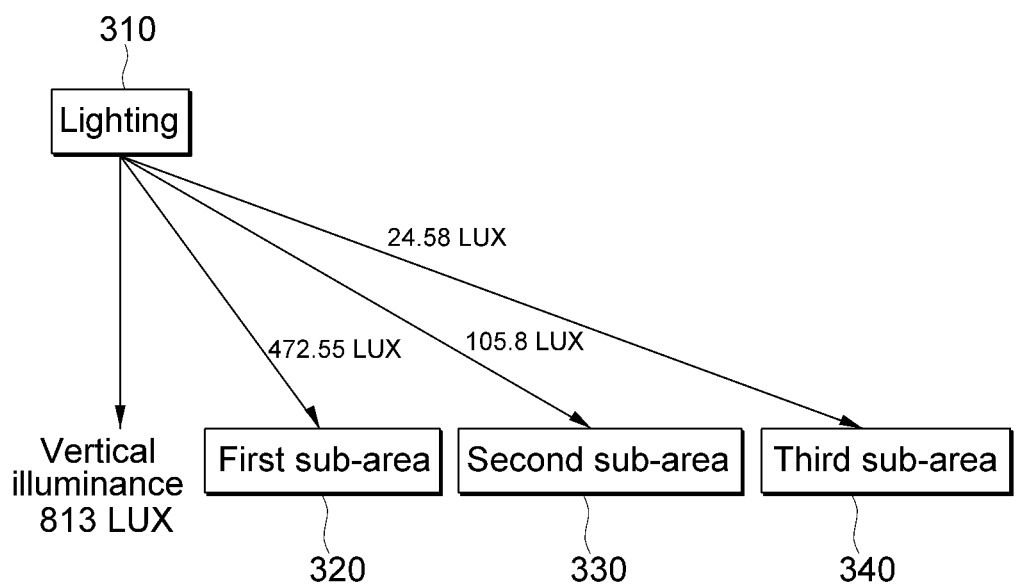
FIG. 3 is a diagram illustrating an example of calculating a detailed influence of a lighting on each sub-area according to an embodiment of the present disclosure.

FIG. 3 is a diagram illustrating an example of calculating a detailed influence of a lighting 310 for each sub-area 320, 330, 340 according to an embodiment of the present disclosure. In the illustrated example, the lighting 310 may be one of a plurality of lightings included in a predetermined area. In addition, the first sub-area 320, the second sub-area 330, and the third sub-area 340 may be sub-areas into which the predetermined area is logically classified. Each sub-area may be associated with a corresponding illuminance sensor or the like.

According to an embodiment, a detailed influence for each sub-area 320, 330, 340 of the lighting 310 may be calculated. For example, a processor (e.g., at least one processor of the lighting control system) may determine a vertical illuminance value of the lighting 310 and determine an illuminance value according to a distance of the lighting 310. Then, the processor may calculate a detailed influence of the lighting 310 on each of the plurality of sub-areas 320, 330, 340 by using a ratio of an illuminance value according to a distance for each of the plurality of sub-areas 320, 330, 340 to a vertical illuminance value of the lighting 310. In such an embodiment, the vertical illuminance value may be determined by turning on the lighting 310 at maximum brightness and then obtaining an illuminance value that affects over a vertical distance. For example, the detailed influence of the lighting 310 may be calculated by Equation 1 below:

$$I_{lux} = M_{lux} / C_{lux} \quad \text{[Equation 1]}$$

where $I_{lux}$ may represent the detailed influence of the lighting 310, $C_{lux}$ may represent the vertical illuminance value of the lighting 310, and $M_{lux}$ may represent the illuminance value of the lighting 310 measured in each sub-area 320, 330, 340. In the illustrated example, the vertical illuminance value of the lighting 310 may be 813 LUX, the illuminance value of the lighting 310 measured in the first sub-area 320 may be 472.55 LUX, the illuminance value of the lighting 310 measured in the second sub-area 330 may be 105.8 LUX, and the illuminance value of the lighting 310 measured in the third sub-area 330 may be 24.58 LUX. That is, the detailed influence of the lighting 310 on the first sub-area 320 may be 58%, the detailed influence of the lighting 310 on the second sub-area 330 may be 13%, and the detailed influence of the lighting 310 on the third sub-area 340 may be 3%. In other words, the detailed influence of the lighting 310 may be inversely proportional to the distance.

Figure 4:
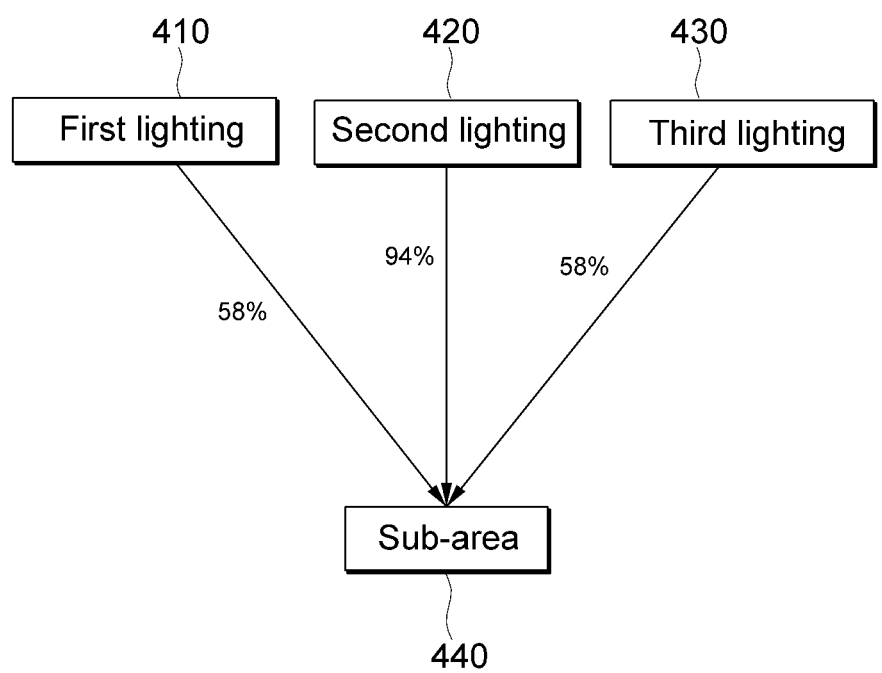
FIG. 4 is a diagram illustrating an example of calculating a complex influence of a plurality of lightings on a specific sub-area according to an embodiment of the present disclosure.

FIG. 4 is a diagram illustrating an example of calculating a complex (e.g., comprehensive) influence of a plurality of lightings 410, 420, 430 on a specific sub-area 440 according to an embodiment of the present disclosure. As illustrated, an influence on the specific sub-area 440 may be determined as a sum of detailed influences of individual lightings. For example, when detailed influences of the first lighting 410, the second lighting 420, and the third lighting 430, having the same vertical illuminance value of 813 lux, on the sub-area 440 are 58%, 94%, and 58%, respectively, an illuminance value of about 1711.76 LUX may be measured in the sub-area 440. In such an embodiment, the sub-area 440 may be one of a plurality of sub-areas included in a predetermined area.

According to an embodiment, the illuminance value (intensity of illuminance) in the sub-area 440 may be determined as a sum of illuminance according to the distance (e.g., by distance) affecting the sub-area 440. For example, the illuminance value (intensity of illuminance) may be calculated by Equation 2 below:

$$P_{lux}^{i} = \sum_{n=1}^{k} I_{lux}^{n} \cdot I_{Efficiency}^{n} \quad \text{[Equation 2]}$$

where $P_{lux}^{i}$ may represent the illuminance value in each of the plurality of sub-areas, $I_{lux}^{n}$ may represent the detailed influence of lighting according to distance, and $I_{Efficiency}^{n}$ may represent the influence of individual lighting at each point. Herein, i may represent each sub-area and/or an illuminance sensor associated with each sub-area, and n may represent individual lighting. In addition, the influence $I_{Efficiency}^{n}$ of individual lighting at each point may be calculated by Equation 3 below:

$$I_{Efficiency}^{n} = P_{lux}^{i} / I_{lux(P)}^{n} \quad \text{[Equation 3]}$$

where $I_{lux(P)}^{n}$ may represent the vertical illuminance of individual lighting in the sub-area $P^{i}$. Using the calculated influence of the lighting, the ranking of influence of the plurality of lightings 410, 420, 430 may be determined.

Figure 5:
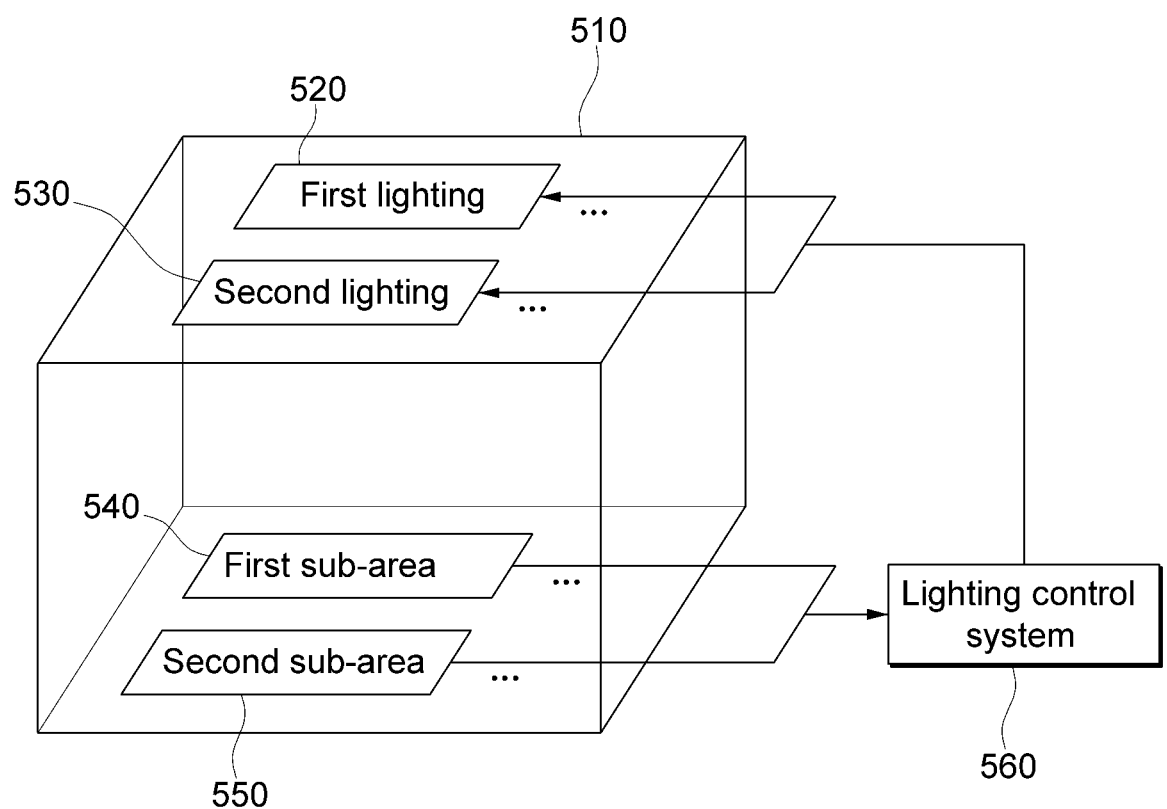
FIG. 5 is a diagram illustrating an example in which a lighting control system according to an embodiment of the present disclosure controls a plurality of lightings by measuring an illuminance of each sub-area.

FIG. 5 is a diagram illustrating an example in which a lighting control system 560 according to an embodiment of the present disclosure controls a plurality of lightings 520, 530 by measuring an illuminance of each of detailed areas 540, 550. As illustrated, a predetermined area 510 may include a plurality of lightings including the first lighting 520 and the second lighting 530 and may be classified into a plurality of sub-areas including the first sub-area 540 and the second sub-area 550. In this case, each of the plurality of sub-areas may be associated with one or more illuminance sensors for measuring an illuminance associated with the sub-areas in real time.

As described above, the lighting control system 560 may classify the predetermined area including the plurality of lightings into a plurality of sub-areas and calculate a detailed influence of each of the plurality of lightings on each of the plurality of sub-areas. Then, the lighting control system 560 may calculate an influence of each of the plurality of lightings on the predetermined area by using a sum of the calculated detailed influences on the plurality of respective sub-areas. In this case, the lighting control system 560 may determine ranking of influence of the plurality of lightings based on the determined influences of the plurality of respective lightings.

According to an embodiment, the lighting control system 560 may control the illuminance on the predetermined area 510 to minimize energy consumption. For example, when lowering the illuminance of the predetermined area 510, the lighting control system 560 may control each of the plurality of lightings in an ascending order of the determined influence ranking. That is, a lighting having the lowest degree of influence on the predetermined area 510 may be controlled first, and then, the next-order (e.g., second lowest) lighting may be controlled. In another example, when increasing the illuminance of the predetermined area 510, the lighting control system 560 may control each of the plurality of lightings in a descending order of the determined influence ranking. In this case, the lighting control system 560 may control the lighting through a ZigBee gateway, but embodiments are not limited thereto.

Additionally, or alternatively, the lighting control system 560 may control an illuminance of a specific sub-area in the predetermined area 510 to minimize energy consumption. For example, when lowering the illuminance of the first sub-area 540, the lighting control system 560 may control each of the plurality of lightings in an ascending order of the determined, detailed influence ranking for the first sub-area 540. In another example, when increasing the illuminance of the first sub-area 540, the lighting control system 560 may control each of the plurality of lightings in a descending order of the determined, detailed influence ranking for the first sub-area 540. With such a configuration, the lighting control system 560 may minimize an increase in energy required to increase the same amount of illuminance when increasing the illuminance and may maximize a decrease in energy required to lower the same amount of illuminance when lowering the illuminance, such that the energy efficiency may be effectively improved.

Figure 6:
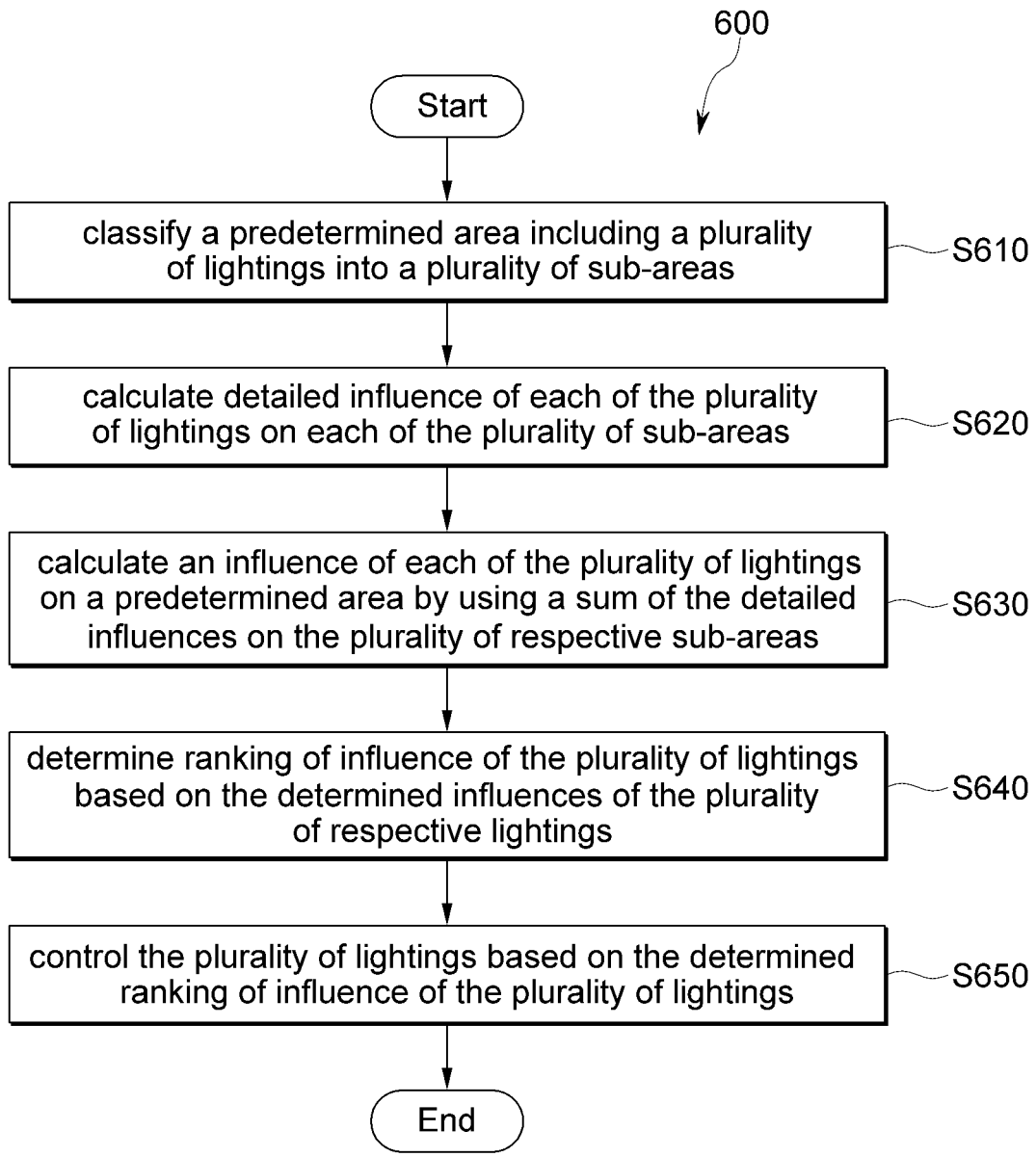
FIG. 6 is a flowchart illustrating an example of a lighting control method based on influence of a lighting according to an embodiment of the present disclosure.

FIG. 6 is a flowchart illustrating an example of a lighting control method 600 based on influence of lighting according to an embodiment of the present disclosure. The lighting control method 600 based on the influence of lighting may be performed by a processor (e.g., at least one processor of a lighting control system). As illustrated, the lighting control method 600 based on the influence of lighting may be initiated by the processor classifying a predetermined area including a plurality of lightings into a plurality of sub-areas (S610).

The processor may calculate a detailed influence of each of the plurality of lightings on each of the plurality of sub-areas (S620). In addition, the processor may calculate an influence of each of the plurality of lightings on a predetermined area by using a sum of the detailed influences on the plurality of respective sub-areas (S630). For example, the processor may determine a vertical illuminance value for each of the plurality of lightings and determine an illuminance value according to a distance for each of the plurality of lightings. Then, the processor may calculate a detailed influence of each of the plurality of lightings on each of the plurality of sub-areas by using a ratio of the illuminance value according to the distance for each of the plurality of sub-areas to the vertical illuminance value of each of the plurality of lightings.

The processor may determine ranking of influence of the plurality of lightings based on the determined influences of the plurality of respective lightings (S640). In such an embodiment, the ranking of influence of the plurality of lightings may include ranking of influence for the predetermined area and ranking of influence for each of the plurality of sub-areas. In addition, the processor may control the plurality of lightings based on the determined ranking of influence of the plurality of lightings (S650). According to an embodiment, when lowering the illuminance of the predetermined area, the processor may control each of the plurality of lightings in an ascending order of the determined influence ranking. In another example, when increasing the illuminance of the predetermined area, the processor may control each of the plurality of lightings in a descending order of the determined influence ranking.

Figure 7:
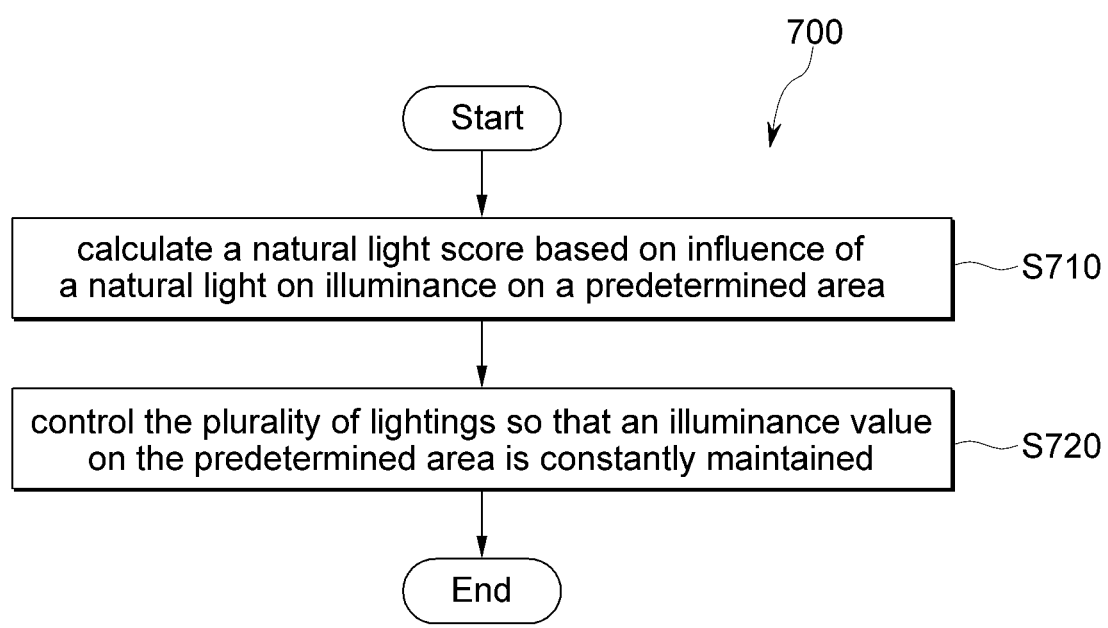
FIG. 7 is a flowchart illustrating an example of a lighting control method based on a natural light score according to an embodiment of the present disclosure.

FIG. 7 is a flowchart illustrating an example of a lighting control method 700 based on a natural light score according to an embodiment of the present disclosure. The lighting control method 700 based on the natural light score may be performed by a processor (e.g., at least one processor of a lighting control system). As described above, the lighting control method 700 based on the natural light score may be initiated by the processor calculating a natural light score based on influence of a natural light on illuminance on a predetermined area (S710). As described above, the processor may calculate the natural light score for the predetermined area and/or each of the sub-areas in the predetermined area by using one or more illuminance sensors installed on the predetermined area. In such an embodiment, the natural light score represents an illuminance value caused by the natural light and may be calculated by an arbitrary algorithm or a machine learning model.

Based on the calculated natural light score, the processor may control the plurality of lightings so that an illuminance value on the predetermined area is constantly maintained (S720). For example, when the natural light score exceeds a predetermined reference, the processor may control the plurality of lightings based on the order of influences (e.g., influence ranking) to lower the illuminance on the predetermined area and/or the sub-area. In addition, when the natural light score does not meet the predetermined reference, the processor may control the plurality of lightings based on the order of influences to increase the illuminance on the predetermined area and/or the sub-area.

Figure 8:
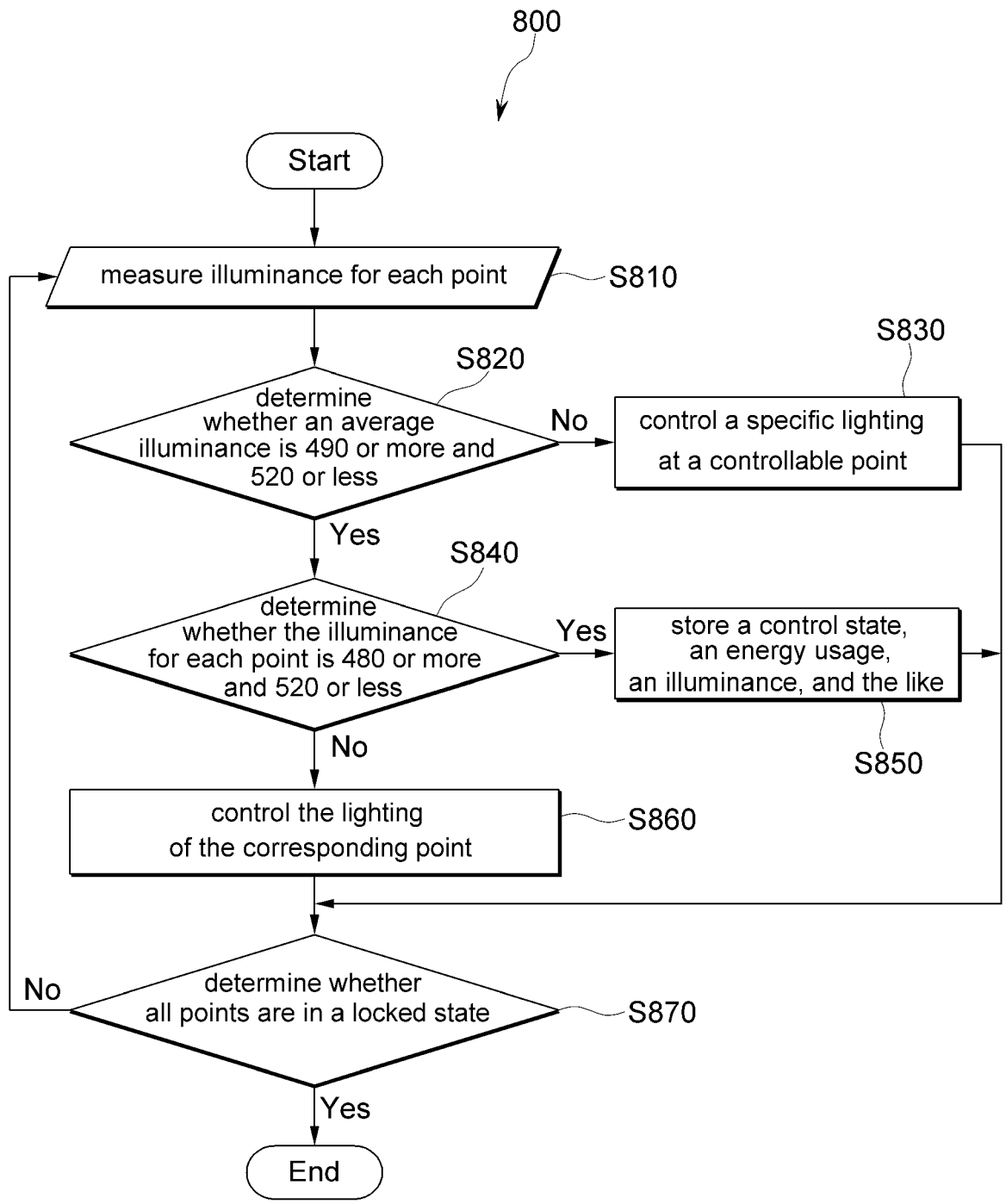
FIG. 8 is a flowchart illustrating an example of a lighting control method according to an embodiment of the present disclosure.

FIG. 8 is a flowchart illustrating an example of a lighting control method 800 according to an embodiment of the present disclosure. The lighting control method 800 may be performed by a processor (e.g., at least one processor of a lighting control system). As illustrated, the lighting control method 800 may be initiated by the processor measuring an illuminance for each point (sub-area) (S810). For example, the processor may measure the illuminance for each point by using an illuminance sensor associated with each point. In this case, the illuminance for each point may be continuously measured or may be measured at predetermined time intervals.

For example, the processor may determine whether an average illuminance of a predetermined area is greater than or equal to 490 and less than or equal to 520 (S820). When it is determined that the average illuminance is less than 490 or greater than 520, the processor may control a specific lighting at a controllable point (S830). According to an embodiment, when the average illuminance is greater than 520, the processor may identify a point having the highest illuminance among controllable points. In addition, the processor may identify a controllable lighting among lightings associated with the identified point. That is, the point and each lighting within the point may be locked or unlocked, and control may be possible only when the lock is released. If there is a controllable lighting, the processor may determine whether there is a lighting that has a higher influence among the corresponding lightings with similar influence. With such a configuration, the processor may select and control the lighting with the lowest degree of influence, thereby controlling the lighting so that the average illuminance may be increased while minimizing energy consumption. Additionally, when there is no controllable lighting, after the lock for the lighting and/or point is unlocked, the process described above may be repeated. When lighting control is complete, the corresponding lighting and/or point may be locked.

According to another embodiment, when the average illuminance is less than 490, the processor may identify a point having the lowest illuminance among controllable points. In addition, the processor may identify a controllable lighting among lightings associated with the identified point. That is, the point and each lighting within the point may be locked or unlocked, and control may be possible only when the lock is released. If there is a controllable lighting, the processor may determine whether there is a lighting that has a lower influence among the corresponding lightings with similar influence. With such a configuration, the processor may select and control the lighting with the highest degree of influence, thereby controlling the lighting so that the average illuminance may be lowered while minimizing energy consumption. Additionally, when there is no controllable lighting, after the lock for the lighting and/or point is unlocked, the process described above may be repeated. When lighting control is complete, the corresponding lighting and/or point may be locked.

The processor may determine whether the illuminance for each point is greater than or equal to 480 and less than or equal to 520 (S840). When the illuminance for each point is 480 or more and 520 or less, the processor may store a control state, an energy usage, an illuminance, and the like (S850). When an illuminance of a specific point is less than 480 or more than 520, the processor may control the lighting of the corresponding point (S860). For example, the processor may compare a difference between the illuminance of the corresponding point and an average illuminance. Then, the processor may control the lighting so that the difference between the illuminance of the corresponding point and the average illuminance is decreased. In such a way, the lighting is controlled and the point where the processing is completed may be locked.

The processor may determine whether all points are in a locked state (S870). That is, the processor may repeat the above-described process until all points are locked. With such a configuration, the processor may effectively control the illuminance so that not only the average illuminance of the predetermined area but also the illuminance of each point is constantly maintained.

The above-described method and/or various embodiments may be implemented in digital electronic circuitry, computer hardware, firmware, software, and/or combinations thereof. Various embodiments of the present disclosure may be executed by a data processing device, for example, one or more programmable processors and/or one or more computing devices, or may be implemented as a computer-readable recording medium and/or a computer program stored in computer-readable recording medium. The above-described computer program may be written in any form of programming language including a compiled language or an interpreted language and may be distributed in any form such as a stand-alone program, a module, a subroutine, or the like. The computer program may be distributed through one computing device, a plurality of computing devices connected through the same network, and/or a plurality of distributed computing devices connected through a plurality of different networks.

The above-described method and/or various embodiments may be performed by one or more processors configured to execute one or more computer programs that process, store, and/or manage any function, task, etc., by operating based on input data or generating output data. For example, the method and/or various embodiments of the present disclosure may be performed by a special purpose logic circuit such as a Field Programmable Gate Array (FPGA) or Application Specific Integrated Circuit (ASIC), and an apparatus and/or system for carrying out the method and/or various embodiments of the present disclosure may be implemented as special purpose logic circuits such as FPGAs or ASICs.

The one or more processors executing the computer program may include general purpose or special purpose microprocessors and/or one or more processors of any kind of digital computing device. The processor may receive instructions and/or data from each of the read-only memory and the random access memory, or may receive instructions and/or data from the read-only memory and the random access memory. In the present disclosure, the components of a computing device performing the method and/or embodiments may include one or more processors for executing instructions, one or more memory devices for storing instructions and/or data.

According to an embodiment, the computing device may send and receive data to and from one or more mass storage devices for storing data. For example, the computing device may receive data from, and/or transmit data to, a magnetic or optical disc. A computer-readable storage medium suitable for storing instructions and/or data associated with a computer program may include any type of non-volatile memory including a semiconductor memory device such as an erasable programmable read-only memory (EPROM), an electrically erasable PROM (EEPROM), or a flash memory device, but embodiments are not limited thereto. For example, computer-readable storage media may include magnetic disks such as internal hard disks or removable disks, magneto-optical disks, CD-ROM and DVD-ROM disks.

To provide for interaction with the user, the computing device may include a display device (e.g., a cathode ray tube (CRT), a liquid crystal display (LCD), etc.) for presenting or displaying information to the user, and a user on the computing device. It may include, but is not limited to, a pointing device (e.g., a keyboard, a mouse, a trackball, etc.) for the users to provide input and/or commands to the computing device. That is, the computing device may further include any other kind of device for providing interaction with a user. For example, the computing device may provide any form of sensory feedback to the user for interaction with the user, including visual feedback, auditory feedback, tactile feedback, and/or the like. On the other hand, the user may provide an input to the computing device through various gestures such as sight, voice, and motion.

In the present disclosure, various embodiments may be implemented in a computing system including a back-end component (e.g., a data server), a middleware component (e.g., an application server) and/or a front-end component. In this case, the components may be interconnected by any form or medium of digital data communication, such as a communication network. For example, the communication network may include a local area network (LAN), a wide area network (WAN), and the like.

The computing device based on the exemplary embodiments described herein may be implemented using hardware and/or software configured to interact with a user, including a user device, a user interface (UI) device, a user terminal, or a client device. For example, the computing device may include a portable computing device such as a laptop computer. Additionally, or alternatively, the computing device may include personal digital assistants (PDA), tablet PCs, game consoles, wearable devices, internet of things (IoT) devices, virtual reality (VR) devices, augmented reality (AR) devices, but embodiments are not limited thereto. The computing device may further include other types of devices configured to interact with a user. In addition, the computing device may include a portable communication device (e.g., a mobile phone, a smart phone, a wireless cellular phone, etc.) suitable for wireless communication over a network, such as a mobile communication network, and the like. The computing device may be configured to communicate with a network server wirelessly using wireless communication technologies and/or protocols such as radio frequency (RF), microwave frequency (MWF), and/or infrared ray frequency (IRF).

As set forth hereinabove, according to one or more embodiments of the present disclosure, in a lighting environment in which multiple lightings are installed, energy for lighting control may be effectively lowered by using the lighting control method based on influence.

In one or more embodiments of the present disclosure, when increasing an illuminance, the lighting control system may minimize an increase in energy required to increase the same amount of illuminance, and in addition, when lowering the illuminance, the lighting control system may maximize a decrease in energy required to decrease the same amount of illuminance, thereby effectively improving energy efficiency.

In one or more embodiments of the present disclosure, the processor may effectively control the lighting so that an illuminance of each point as well as an average illuminance of a predetermined area is constantly maintained.

The effects of the present disclosure are not limited to the above-mentioned effects, and other effects not mentioned may be clearly understood by those of ordinary skill in the art (referred to as "person of ordinary skill") from the description of the claims.

Various embodiments of the invention, including specific structural and functional details, are exemplary. Accordingly, the embodiments of the present disclosure are not limited to those described above and may be implemented in various other forms. In addition, the terminology used in the present disclosure is for describing some embodiments and is not to be construed as limiting the embodiments. For example, singular terms may be construed to include the plural terms as well, unless the context clearly dictates otherwise.

In the present disclosure, unless otherwise defined, all terms used herein, including technical or scientific terms, have the same meaning as commonly understood by one of ordinary skill in the art to which the concept belongs. In addition, commonly used terms such as predefined terms should be interpreted as having a meaning consistent with the meaning in the context of the related art.

Although the present disclosure has been described with reference to some embodiments, various modifications and changes may be made without departing from the scope of the present disclosure that may be understood by those skilled in the art to which the present disclosure pertains. Further, such modifications and variations are intended to fall within the scope of the claims appended hereto.

What is claimed is:

1. A method of controlling lighting based on influence of the lighting, the method performed by at least one processor, the method comprising:
   classifying a predetermined area comprising a plurality of lightings into a plurality of sub-areas;
   calculating a detailed influence of each of the plurality of lightings relative to each of the plurality of sub-areas;
   determining an influence of each of the plurality of lightings relative to the predetermined area by using a sum of the calculated, detailed influences;
   determining a ranking of influences associated with each of the plurality of lightings, based on each of the determined influences; and
   controlling the plurality of lightings based on the determined ranking of influences such that, when lowering an illuminance of the predetermined area, the controlling comprises adjusting each of the plurality of lightings in an ascending order according to the determined ranking of influences.

2. The method of claim 1, wherein calculating the detailed influence further comprises:
   determining a vertical illuminance value for each of the plurality of lightings;
   determining an illuminance value according to a distance between each of the plurality of lightings and each of the plurality of sub-areas; and
   calculating the detailed influence of each of the plurality of lightings relative to each of the plurality of sub-areas by using a ratio of the illuminance value to the vertical illuminance value.

3. The method of claim 1, wherein controlling of the plurality of lightings further comprises:
   when increasing an illuminance of the predetermined area, adjusting each of the plurality of lightings in a descending order according to the determined ranking of influences.

4. The method of claim 1, further comprising:
   calculating a natural light score based on influence of a natural light on illuminance on the predetermined area,
   wherein controlling the plurality of lightings further comprises:
   controlling the plurality of lightings such that an illuminance value associated with the predetermined area is constantly maintained based on the calculated natural light score.

5. The method of claim 1, wherein determining the ranking of influences further comprises:
   ranking an influence associated with the predetermined area; and
   ranking the influences associated with each of the plurality of sub-areas.

6. A non-transitory computer-readable recording medium storing instructions for execution by one or more processors that, when executed by the one or more processors, cause the one or more processors to perform the method according to claim 1.

7. A lighting control system comprising:
   a communication module;
   a memory; and
   at least one processor connected to the memory and configured to execute at least one computer-readable program included in the memory, wherein the at least one program comprises instructions to:
classify a predetermined area comprising a plurality of lightings into a plurality of sub-areas;
calculate a detailed influence of each of the plurality of lightings relative to each of the plurality of sub-areas;
determine an influence of each of the plurality of lightings relative to the predetermined area by using a sum of the calculated, detailed influences;
determine a ranking of influences associated with each of the plurality of lightings, based on each of the determined influences; and
control the plurality of lightings based on the determined ranking of influences such that, when increasing an illuminance of the predetermined area, the instruction to control further comprises an instruction to adjust each of the plurality of lightings in a descending order according to the determined ranking of influences.

* * * * *